United States Patent
Ambar et al.

(10) Patent No.: US 10,118,405 B2
(45) Date of Patent: Nov. 6, 2018

(54) CROSS-TALK EFFECT IN A LASER DIODE ARRAY

(71) Applicant: HEWLETT-PACKARD INDIGO B.V., Amstelveen (NL)

(72) Inventors: Oron Ambar, Ness Ziona (IL); Yuval Yunger, Ness Ziona (IL); Haim Vladomirski, Rehovot (IL)

(73) Assignee: HP Indigo B.V., Amstelveen (NL)

( * ) Notice: Subject to any disclaimer, the term of this patent is extended or adjusted under 35 U.S.C. 154(b) by 0 days.

(21) Appl. No.: 15/545,976

(22) PCT Filed: Apr. 29, 2015

(86) PCT No.: PCT/EP2015/000878
§ 371 (c)(1),
(2) Date: Jul. 24, 2017

(87) PCT Pub. No.: WO2016/173604
PCT Pub. Date: Nov. 3, 2016

(65) Prior Publication Data
US 2018/0015736 A1    Jan. 18, 2018

(51) Int. Cl.
*B41J 2/455*    (2006.01)
*B41J 2/45*    (2006.01)
(Continued)

(52) U.S. Cl.
CPC .............. *B41J 2/455* (2013.01); *B41J 2/45* (2013.01); *B41J 29/393* (2013.01); *G01J 1/4257* (2013.01);
(Continued)

(58) Field of Classification Search
CPC ........ B41J 2/455; B41J 29/393; G01J 1/4257; H04N 5/359; H04N 1/40031; H04N 1/4005; H05B 37/00
See application file for complete search history.

(56) References Cited

U.S. PATENT DOCUMENTS

| | | |
|---|---|---|
| 5,404,367 A | 4/1995 | AuYeung et al. |
| 6,553,044 B1 | 4/2003 | Eden |

(Continued)

FOREIGN PATENT DOCUMENTS

| | | |
|---|---|---|
| EP | 0738071 A2 | 10/1996 |
| JP | 2001-105654 | 4/2001 |
| WO | WO-00/24096 A1 | 4/2000 |

OTHER PUBLICATIONS

Hayashi et al; "Reducing Electrical Crosstalk in Laser-Diode Array Modules by Using a Film-Carrier Interconnection"; Sep. 1995; IEEE Aerospace and Electronic Systems Society.

*Primary Examiner* — Kristal Feggins
(74) *Attorney, Agent, or Firm* — HP Inc. Patent Department (57) ABSTRACT

An electric cross-talk, ECT, effect of laser-diode array is measured by capturing a first image of a first laser spot of a first laser diode with a second laser diode being turned off (10) and a second image of a second laser spot of the first laser diode while switching on the second laser diode (20). A spot-energy ratio is determined (30) by processing the images, and an ECT-coupling coefficient on the first laser diode is calculated (40) by switching the second laser diode. Compensating for the ECT effect includes determining a signal for predicting the ECT effect on the first laser diode by switching the second laser diode, and generating a driving signal based on a desired current profile and the ECT-prediction signal.

20 Claims, 4 Drawing Sheets

(51) Int. Cl.
*H04N 1/40* (2006.01)
*B41J 29/393* (2006.01)
*G01J 1/42* (2006.01)
*H04N 5/359* (2011.01)

(52) U.S. Cl.
CPC ......... *H04N 1/40031* (2013.01); *H04N 5/359* (2013.01)

(56) References Cited

U.S. PATENT DOCUMENTS 7,400,352 B1 7/2008 Luo
2012/0173175 A1 7/2012 Devicharan et al.

CROSS-TALK EFFECT IN A LASER DIODE ARRAY

CROSS-REFERENCE TO RELATED APPLICATION

This application is a U.S. National Stage Application of and claims priority to International Patent Application No. PCT/EP2015/000878, filed on Apr. 29, 2015, and entitled "CROSS-TALK EFFECT IN A LASER DIODE ARRAY," which is hereby incorporated by reference in its entirety.

BRIEF DESCRIPTION OF THE DRAWINGS

Examples will be described, by way of example only, with reference to the accompanying drawings in which corresponding reference numerals indicate corresponding parts and in which.

DETAILED DESCRIPTION OF EMBODIMENTS

The description refers to measuring an electric cross-talk (ECT) effect in a laser diode array. It also refers to compensating for the ECT effect. The description further refers to a print press and a writing head for the print press that includes functionality for measuring an ECT effect in a laser diode array and/or compensating for the ECT effect. The description further refers to printing of digital images using the writing head and/or the print press.

In an example laser printing process a digital image may be transformed, e.g. by the print press or by the writing head, into to a physical one on a photoconductor. The digital image may be transformed in pixel codes that are sent to a writing head controller. An example writing head controller controls a plurality of different laser channels each including a laser diode. A plurality of laser diodes is arranged in a laser diode array of the writing head. For example, the laser diode array includes 18, 28 or 50 laser diodes or hundreds or thousands of laser diodes. Controlling a laser channel may include generating a driving signal for driving the laser diode according to a desired current profile to achieve a desired laser power output for exposing the photoconductor. Turning on and off (i.e. powering the laser diode according to the desired current profile) provides a laser pulse for "writing", i.e. exposing a pixel on the photoconductor.

Switching on or off a laser diode may cause an ECT effect on other laser diodes of the laser diode array. The ECT effect may be caused by coupling of physically closed signal lines by parasitic capacitance and/or inductance causing a signal in one laser channel to create interferences in other laser channels which, for example, show as voltage/current spikes in the other laser channels. Due to the ECT effect, the desired current profile may not be achieved in response to applying the driving signal, namely if another laser diode is being switch and, thereby, affecting a signal path for driving the laser diode. The laser power output of a laser diode which is in a turned on state may vary in response to another laser diode being switched due to an ECT effect caused by switching the other laser diode. This may reduce print quality.

Figure 1:
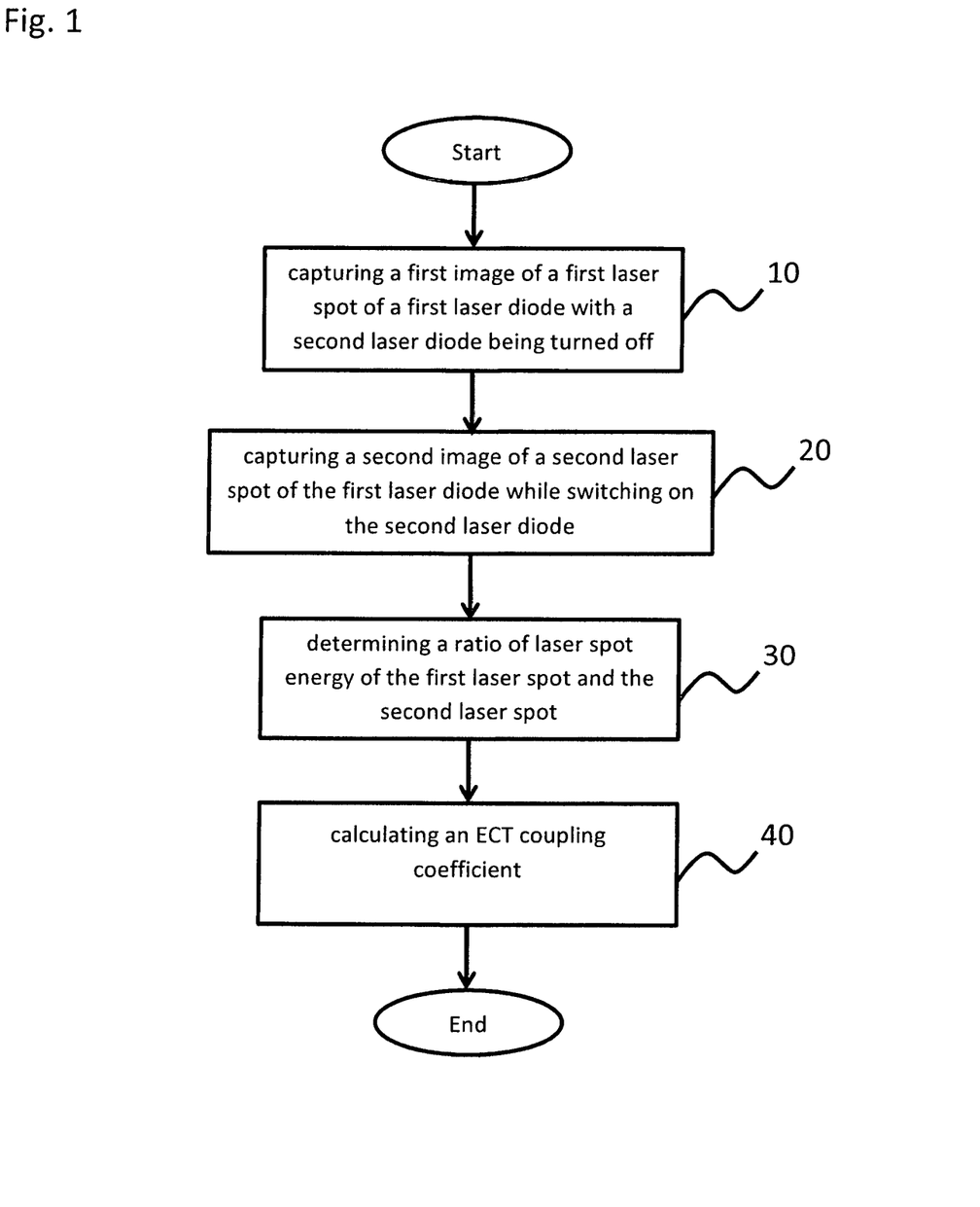
FIG. 1 shows a block diagram of an example method for measuring an electric cross-talk effect in a laser diode array.

Now referring to FIG. 1, which illustrates an example method of measuring an ECT effect in the laser diode array. The example method includes capturing, in block 10, by an image sensor, a first image of a first laser spot of a first laser diode with the second laser diode being turned off. The first image may be captured while none of the other laser diodes of the laser diode array is currently being switched. For example, the first image is captured while the first laser diode is left in a turned on state and all other diodes of the plurality of laser diodes are left in a turned off state, referred to herein as a "single pixel spot mode". Operating the laser diode array in a single pixel spot mode enables the capture of the first image free of possible ECT effects caused by switching other laser diodes in the laser diode array.

In block 20, a second image of a second laser spot of the first laser diode is captured by the image sensor. The second image can be captured while switching on the second laser diode, e.g. in the single pixel spot mode. Therefore, the second image carries information about the laser power output of the first laser diode that corresponds to the driving signal of the first laser diode being overlapped by the ECT effect caused by switching the second laser diode.

In some examples, capturing the second image includes: a) switching on the first laser diode, wherein, in some of these examples some or all of the other laser diodes of the laser diode array are switched off; and b) switching on the second laser diode and simultaneously capturing the second image. Simultaneously switching on the second laser diode and capturing the second image may include a delay between the switching on and the capturing. In some examples, there is a delay between switching on the second laser diode and capturing the second image. For example, capturing the second image is triggered in response to switching on the second laser diode after a delay, e.g. in the range of nanoseconds, microseconds or milliseconds. This enables, in some examples, to capture the second image as a snap-shot of a maximum influence of the ECT effect on the first laser diode, and, thereby, considering that the ECT effect has a temporal component. In some examples, capturing the second image is triggered by a voltage or current threshold, which is, for example, measured in the signal path for driving the first laser diode, because the ECT effect may induce a voltage/current spike in the signal path.

In some examples, only the second laser diode of the plurality of laser diodes is switched while capturing the second image. This isolates the ECT effect on the first laser diode associated with switching the second laser diode. In some examples, the first laser diode is left in a turned on state and all other diodes of the laser diode array other than the second laser diode may be left in a turned off state during capturing the second image.

In the example illustrated in FIG. 1, in block 30, a ratio of laser spot energy of the first laser spot and the second laser spot is determined by image processing of the first image and the second image. For example, the ratio is determined as a ratio of pixel values of the captured first and second image. The first and the second image may be each composed of a single pixel, a single line of pixels or a two-dimensional pixel matrix. Pixels of the first and second image may represent monochromatic intensity information or three or four colors information, e.g. a three color RGB-pixel having a red, green and blue intensity component. A pixel may have a color depth of 8 bits, 16 bits or 32 bits.

In some examples, the image sensor, which may be a member of the writing head and/or of the print press, may include a single photo diode, a CMOS or CCD line array or a CCD or CMOS image matrix sensor. In some examples, the image sensor includes a digital camera. In some examples, the image sensor is a member of the writing head and/or the print press. In some other examples, the image sensor is separate from, i.e. external from the writing head and/or the print press, e.g. it is an image sensor in a lab. In some examples, a spectral filter with a high transmission peak that corresponds to a wavelength of the first laser diode may be arranged between the image sensor and the laser spot and/or the first laser diode.

In some examples, determining the ratio of laser spot energy includes determining a ratio of an average pixel value of the first image and an average pixel value of the second image. In some examples, determining the ratio of laser spot energy includes determining a maximum intensity or determining a peak intensity of an intensity distribution along the pixels of the first and second image respectively. In some examples, a pixel value determined from the first and/or second image is weighted by a weighting function, which may correspond to a correlation between the laser spot energy and the pixel values of the first and/or second image. This may enable characteristics of the image sensor to be considered. For example, a weighting function that models the image sensor sensitivity and/or non-linear signal processing of the image sensor can be applied to the pixel values.

Based on the determined ratio of laser spot energy of the first laser spot and the second laser spot, in the example illustrated in FIG. 1, in block 40, an ECT coupling coefficient associated with the ECT effect on the first laser diode caused by switching (on and/or off, e.g. in the single pixel spot mode) the second laser diode is calculated. This ECT coupling coefficient characterizes the strength of the influence of the ECT effect on the first laser diode caused by switching the second laser diode. Since the ECT effect is present both upon switching on and switching off the second laser diode (generally with the same magnitude but in opposite directions) the ECT coupling coefficient associated with the ECT effect on the first laser diode caused by switching on the second laser diode, or by switching off the second laser diode, or by switching on and off the second laser diode, can be calculated.

For example, the ECT coupling coefficient may be calculated based on a laser modulation current of the first laser diode, a laser modulation current of the second laser diode and a laser off current of the second laser diode. In some examples, the ECT effect may be approximated as being proportional to the current change ΔI which in the case of a single (e.g. the second) laser diode being switched on may be formulated as $$\Delta I = \overline{(I_{mod} + I_{threshold})}^{ON_{current}} - \overline{(I_{threshold} - I_{off})}^{OFF_{current}};$$

wherein $I_{threshold}$ is the lasing threshold current of a laser diode, $I_{mod}$ is the laser modulation current (i.e. a part of the laser current on top of the lasing threshold current $I_{threshold}$ for driving the laser diode in a turned on state), and $I_{off}$ is the laser off current (i.e. the amount of the laser current being below the lasing threshold current $I_{threshold}$, wherein $I_{off}$ applied when the laser diode is turned off). Laser diodes may have individual laser modulation currents $I_{mod}$ and individual lasing threshold currents $I_{threshold}$. For example, the first laser diode and the second laser diode have a first laser modulation current $I_{mod,1}$ and first lasing threshold current $I_{threshold,1}$ and a second laser modulation current $I_{mod,2}$ and second lasing threshold current $I_{threshold,2}$ respectively.

In some examples, the ECT coupling coefficient $C_{j,k}$ associated with the ECT effect on the first laser diode caused by switching the second laser diode may be calculated based on the determined ratio $R_j$ of laser spot energy for the first laser diode as follows, wherein j designates a first laser diode and k designates a respective second laser diode out of the plurality of laser diodes of the laser diode array:

$$R_j = \frac{P_{j,2\,lasers}}{P_{j,1\,lasers}} = \frac{\text{eff} \cdot I_{j,2\,lasers}^{mod}}{\text{eff} \cdot I_{j,1\,lasers}^{mod}} = \frac{I_j^{mod,0} + C_{j,k}\Delta I_k}{I_j^{mod,0}} = 1 + C_{j,k} \cdot \frac{(I_{off} + I_k^{mod,0})}{I_j^{mod,0}},$$

wherein $P_{j,1}$ laser is the first laser diode's laser energy with the first laser diode being turned on, $P_{j,2}$ lasers is the first laser diode's laser energy in the moment of the second laser diode being switched on. In this equation it is assumed that all the laser currents are above the lasing threshold current $I_{threshold}$, therefore the ECT effect is approximated as to change the modulation current which is linearly translated to laser power. Correspondingly, eff is the laser power efficiency and $I_{j,2\,laser}^{mod}$ and $I_{j,1\,laser}^{mod}$ are the first laser diode's modulation currents (wherein the terms $I_{mod,0}$ are command modulation currents implemented by hardware and/or software of the writing head controller). $C_{j,k}$ is the ECT coupling coefficient between the first laser diode j and the second laser diode k and $\Delta I_k$ is the current change of the second laser diode (causing the ECT effect on the first laser diode).

Therefore, in some examples, ECT coupling coefficients $C_{j,k}$ may be calculated based on the determined ratio e.g. as follows:

$$C_{j,k} = (R_j - 1) \cdot \frac{I_j^{mod,0}}{(I_{off} + I_k^{mod,0})}.$$

In some examples, for the first laser diode a respective ECT coupling coefficient may be measured as described before with regard to each of the (remaining) laser diodes of the plurality of laser diodes. In other words, if the laser diode array as a total number of n laser diodes, for the first laser diode n−1 ECT coupling coefficients are measured. This enables to measure the particular ECT effect of each of the laser diode array's laser diodes on the first laser diode.

In some examples, this may be performed for each of the laser diode array's laser diodes as a first laser diode. Thus, for each pair j, k of any two laser diodes j, k of the laser diode array a ECT coupling coefficient $C_{j,k}$ may be measured as described before. This may correspond to n times (n−1) measurements of a respective ECT coupling coefficient $C_{j,k}$.

In some examples, the measurement of the ECT coupling coefficients is performed automatically for least two or for all combinations of any two laser diodes j, k of the laser diode array. Therefore, in some examples, the writing head and/or the print press may have a writing head controller to individually switching each of the plurality of laser diodes. Automatically measuring the ECT coupling coefficients (which includes capturing the first image and the second image, determining the ratio of laser spot energy and calculating the ECT coupling coefficient as described before) may include synchronizing the writing head controller and the image sensor. Synchronizing the writing head controller and the image sensor may include, for each laser diode pair j, k: switching on, by the writing head controller, the first laser diode j; switching off, by the writing head controller, all laser diodes other than the first laser diode j; capturing, by the image sensor, the first image of the laser spot of the first laser diode j; synchronously capturing, by the image sensor, the second image of the laser spot of the first laser diode j while (synchronously, i.e. using the delay described before) switching on, by the writing head controller, the second laser diode j. In this description, the expression "switching on a laser diode" may also to be understood as a laser, which is already in a turned on state, is left in the turned on state. This correspondingly applies to the expression "switching off a laser diode". In some examples, "switching on a laser diode" refers to a single pixel spot mode which creates a laser spot by a single turned on laser diode.

The examples with regard to measuring the ECT effect described before may incorporate the following examples with regard to compensating for an ECT effect and viceversa. However, the examples described before and the following examples may also be realized independently from each other. For example, a writing head and/or a print press may carry out the examples before and hereinafter separately or in any combination.

Figure 2:
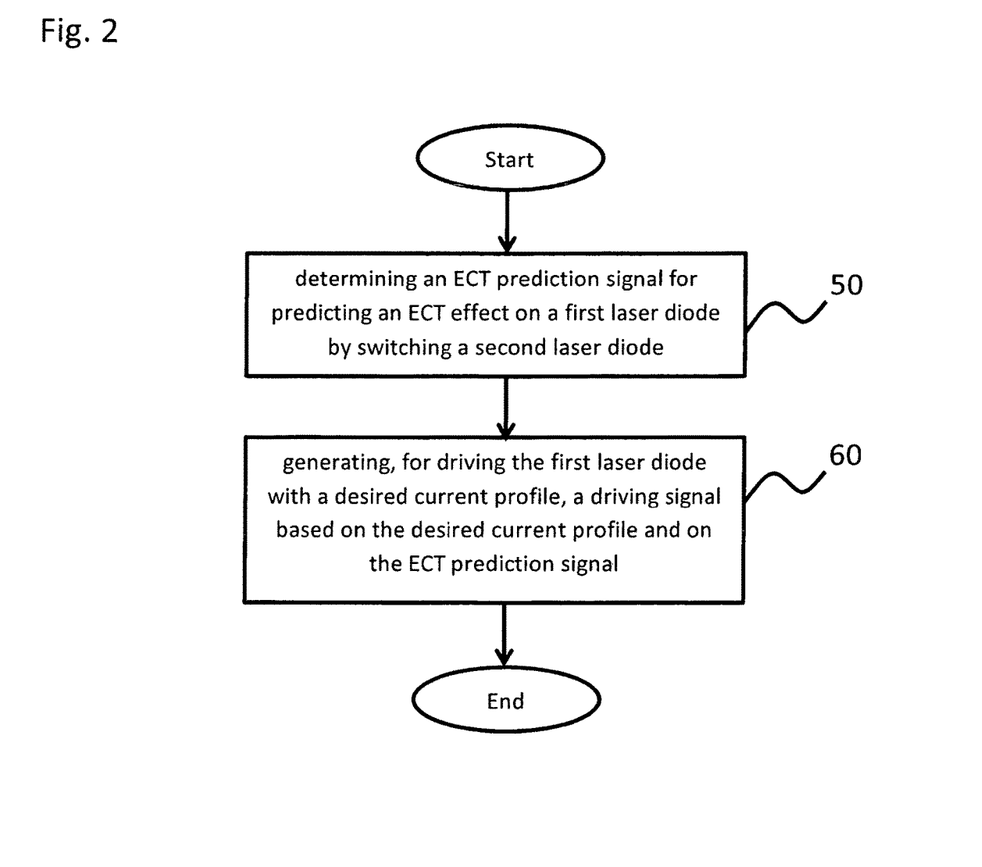
FIG. 2 shows a block diagram of an example method for compensating an electric cross-talk effect in a laser diode array.

Now referring to FIG. 2, which illustrates an example method of compensating for an ECT effect in a laser diode array having a plurality of laser diodes. The example method includes determining, in block 50, an ECT prediction signal for predicting an ECT effect on the first laser diode by switching the second laser diode. The ECT prediction signal may approximate and/or model a current or voltage induced in a signal path for powering the first laser diode by an ECT effect caused by switching the second laser diode. In some examples, determining the ECT prediction signal is based on an ECT coupling coefficient, which may be measured as described before.

The example method illustrated in FIG. 2 may further include generating, in block 60, a driving signal based on a desired current profile and on the ECT prediction signal. The desired current profile describes a current profile of the current the first laser diode should be driven by in order to achieve a desired laser power output (profile).

In some examples, ECT prediction signals have a "digital" shape rather than an "analog" shape as in other examples. Such ECT prediction signals may signal constant (offset) values for compensating for ECT effects. For example, a digital shaped ECT prediction signal may have a (substantially) rectangular shape, wherein a plateau level of the rectangular shape represents the constant value. This allows examples of the present disclosure to achieve a desired entire laser spot power by controlling levels of the (digital shaped) ECT prediction signal.

In some examples, the driving signal may be generated by superposing the desired current profile and the negated ECT prediction signal. This enables driving the first laser diode with the desired current profile even under the influence of an ECT effect caused by switching the second laser diode. In other words, the generated driving signal and the ECT effect complement one another, which results in the first laser diode being driven according to the desired current profile.

Compensating for an ECT effect as described before enables printing digital halftone screens that have a parallel or almost parallel geometry (e.g. smaller than 30°, 20° or 10°) with regard to a direction of the laser diodes being arranged in line in the laser diode array, since this compensation reduces lasers scan banding. This enables printing digital halftone screens or solid patterns which toggles more than one laser diode in a similar geometry to the laser diode array, e.g. printing a line or a line screen with an angle close to the line along which the laser diodes are arranged in the laser diode array.

In some examples, the desired current profile takes into account a laser diode characteristic, an optics transmission profile, color compensation and/or print quality enhancement features. In some examples the current/voltage level is continuous, e.g. it may have more than dozens of levels or can be in the scale of thousands of levels with µA/µV resolution. This enables to achieve high print quality by the lasers' driving current following accurately the desired current profile, and, thereby reducing quality artifacts such as lasers scan banding or image graininess.

In some examples, determining the ECT prediction signal is based on an ECT coupling coefficient associated with the ECT effect on the first laser diode caused by switching (at least) the second laser diode. For example, the ECT prediction signal may be modeled as follows:

$$\sum_{k}^{n} C_{j,k} \Delta I_k$$

wherein $C_{j,k}$ is the ECT coupling coefficient between the first laser diode j and the remaining laser diodes k of the laser diode array, and $\Delta I_k$ is the electrical current derivative of the driving currents of the laser diodes k (which causes the ECT effect on the first laser diode j).

In some examples, the driving signal $I_{driving}$ for the laser diode j may be generated based on the ECT prediction signal and the desired current profile $I_{target}$ according to the following equation:

$$I_{driving} = I_{target} - \sum_{k}^{n} C_{j,k} \Delta I_k$$

To reduce the computational effort of a writing head controller and/or to enable the writing head to be compatible with legacy presses, the driving signal may be generated by the writing head itself. In some examples, the writing head controller includes an electronic hardware circuit with interconnected logic gates, e.g. an ASIC or a FPGA, to generate driving signals based on received printing signals. This enables the print press to send print signals to the writing head that do not consider any ECT effect. The writing head receives the print signals and converts them into driving signals for the laser diodes based on information about the ECT effects between the laser channels, (e.g., the ECT prediction signals). In order to compensate for the ECT effect, the driving signal may be calculated in real time during printing, e.g. with the frequency of writing pixels on the photoconductor.

The ECT coupling coefficients may be stored, initialized and/or updated in a memory of the writing head or the print press when manufacturing or installing the writing head and the print press or when performing a calibration routine of the writing head and/or the print press. At a startup for operating, the writing head or print press the ECT coupling coefficients may be read from the memory in order to generate the driving signals during a print operation.

In some examples, the laser diode array is a monolithic laser diode array. For example, up to 10, 20, 30, 50, 100, 500, 1000, 2000, or 5000 laser diodes may be integrated in and operated by a single chip. The laser diode array may have a pitch which is on an order of tenths or hundreds of microns and/or the pixel period is of an order of 10 nanoseconds.

Figure 3:
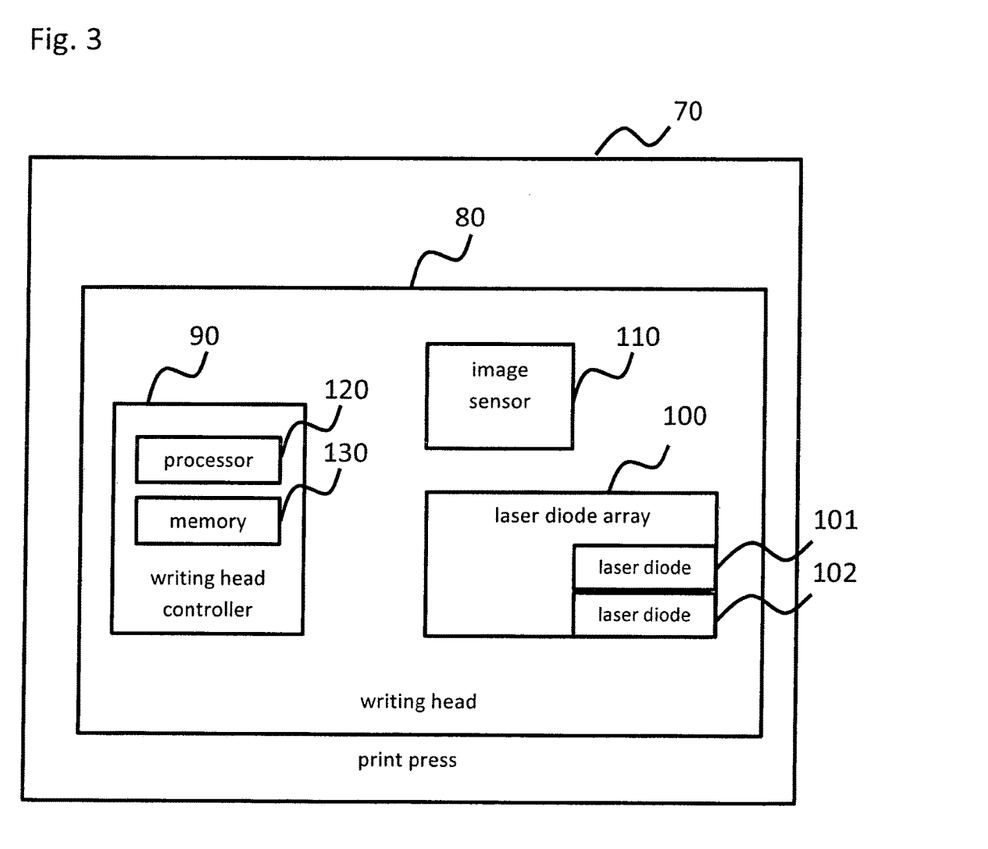
FIG. 3 is an illustration of an example print press with a writing head for transforming a digital image to a physical image on a photoconductor.

Now referring to FIG. 3, which shows an example print press 70 with a writing head 80, e.g. a digital press for transforming a digital image to a physical image on a photoconductor. The writing head 80 has a laser diode array 100 with a plurality of laser diodes including a first laser diode 101 and a second laser diode 102. The writing head 80 also has a writing head controller 90 for generating driving signals for the laser diodes of a laser diode array 100, wherein the writing head controller 90 has a processor 120 and a memory 130.

In some examples, the writing head 80 has an image sensor 110 to capture images of laser spots of the laser diodes. The memory 130 stores executable instructions that when executed by the processor 120 cause the writing head controller 90 to capture, by the image sensor 110, a first image of a first laser spot of the first laser diode 101 with the second laser diode 102 being turned off and a second image of a second laser spot of the first laser diode 101 while switching on the second laser diode 102. Furthermore, the executable instructions that when executed by the processor 120 cause the writing head controller 90 to determine, by image processing of the first image and the second image, a ratio of laser spot energy of the first laser spot and the second laser spot, and calculate, based on the determined ratio of laser spot energy, an ECT coupling coefficient associated with the ECT effect on the first laser diode 101 by switching the second laser diode.

In other examples, the memory 130 comprises executable instructions that when executed by the processor 120 further cause the writing head controller 90 to determine an ECT prediction signal for predicting an ECT effect on the first laser diode 101 by switching the second laser diode 102, and generate, for driving the first laser diode 101 with a desired current profile, a driving signal based on the desired current profile and on the ECT prediction signal.

In still other examples, the memory 130 comprises executable instructions that when executed by the processor 120 cause the writing head controller 90 to perform a method of measuring an ECT effect in the laser diode array 100 and a method of compensating for an ECT effect in the laser diode array 100 as described before.

Figure 4:
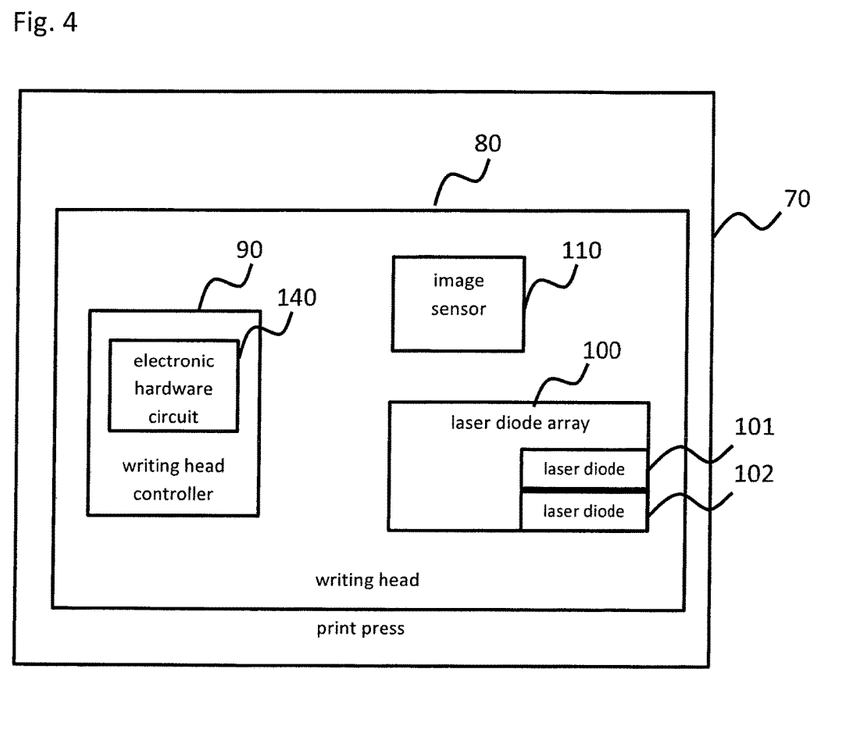
FIG. 4 is an illustration of another example print press with a writing head for transforming a digital image to a physical image on a photoconductor.

Now referring to FIG. 4, which shows an example print press 70 with a writing head 80, e.g. a digital press for transforming a digital image to a physical image on a photoconductor. The writing head 80 has a laser diode array 100 with a plurality of laser diodes including a first laser diode 101 and a second laser diode 102. The writing head 80 also has a writing head controller 90 for generating driving signals for the laser diodes of a laser diode array 100, wherein the writing head controller 90 has an electronic hardware circuit 140 with interconnected logic gates, e.g. an ASIC or a FPGA.

In some examples, the writing head 80 has an image sensor 110 to capture images of laser spots of the laser diodes. The electronic hardware circuit 140, when powered, causes the writing head controller 90 to capture, by the image sensor 110, a first image of a first laser spot of the first laser diode 101 with the second laser diode 102 being turned off and a second image of a second laser spot of the first laser diode 101 while switching on the second laser diode 102. Furthermore, the electronic hardware circuit 140, when powered, causes the writing head controller 90 to determine, by image processing of the first image and the second image, a ratio of laser spot energy of the first laser spot and the second laser spot, and to calculate, based on the determined ratio of laser spot energy, an ECT coupling coefficient associated with the ECT effect on the first laser diode 101 by switching the second laser diode 102.

In other examples, the electronic hardware circuit 140, when powered, causes the writing head controller 90 to determine an ECT prediction signal for predicting an ECT effect on the first laser diode 101 by switching the second laser diode 102, and generate, for driving the first laser diode 101 with a desired current profile, a driving signal based on the desired current profile and on the ECT prediction signal.

In still other examples, the electronic hardware circuit 140, when powered, causes the writing head controller 90 to perform a method of measuring an ECT effect in the laser diode array 100 and a method of compensating for an ECT effect in the laser diode array 100 as described before.

Now referring to FIG. 3 and FIG. 4, in some examples, the print press is a liquid electrophotography print press (LEP) and the writing head is included in a liquid electrophotography print press (LEP), e.g. it is a liquid electrophotography writing head. However, implementations of the present disclosure are also to be understood with regard to a separate writing head.

In some examples, the print press may be a scanning type print press and/or the writing head may be a scanning type writing head designed for being mounted on a horizontally moveable carriage of the print press for writing the transformed digital image swath-by-swath on the photoconductor. This allows for laser diode arrays not covering a whole page width. In some other examples, the print press may be a page-wide print press to write the transformed digital image with a single relative movement between the writing head and the photoconductor. In these print presses the traditional concept of the writing head moving in a scan direction while writing pixels on the photoconductor in a swath-wise manner is no longer valid. Page-Wide print presses/writing heads allow significant printing throughput improvements.

In some examples, measuring the ECT effect, in particular capturing the images of the laser spots, is performed dynamically, e.g. during printing or a scanning motion of the writing head. In some other examples, measuring the ECT effect is performed statically without moving the writing head or without performing a printing process simultaneously. In some examples the capture can be done by an internal digital camera (as image sensor) inside the writing head; in other examples by an external digital camera in the print press or in a lab.

Although certain methods and products have been described herein, the scope of coverage of this patent is not limited thereto. On the contrary, this patent covers all embodiments fairly falling within the scope of the appended claims either literally or under the doctrine of equivalents.

The invention claimed is:

1. A method for measuring an electric cross-talk (ECT) effect in a laser diode array, wherein the laser diode array comprises a plurality of laser diodes including a first laser diode and a second laser diode;

comprising:
 capturing, by an image sensor, a first image of a first laser spot of the first laser diode with the second laser diode being turned off;

capturing, by the image sensor, a second image of a second laser spot of the first laser diode while switching on the second laser diode;

determining, by image processing of the first image and the second image, a ratio of laser spot energy of the first laser spot and the second laser spot; and calculating, based on the determined ratio of laser spot energy, an ECT coupling coefficient associated with the ECT effect on the first laser diode by switching the second laser diode.

2. The method according to claim 1, wherein calculating the ECT coupling coefficient is further based on a laser modulation current of the first laser diode, a laser modulation current of the second laser diode and a laser off current of the second laser diode.

3. The method according to claim 1, wherein capturing a first image, capturing a second image, determining a ratio of laser spot energy and calculating an ECT coupling coefficient is performed for each pair of laser diodes in the plurality of laser diodes.

4. The method according to claim 1, wherein the laser diode array is a monolithic laser diode array; wherein the laser diode array and the image sensor are members of a scanning writing head of a liquid electrophotography print press (LEP); and wherein capturing the first image and capturing the second image is performed during a scanning motion of the scanning writing head.

5. The method according to claim 1, wherein capturing the first image and the second image, determining the ratio of laser spot energy and calculating the ECT coupling coefficient is automatically performed by synchronizing a writing head controller switching each of the plurality of laser diodes and the image sensor.

6. The method according to claim 1, further comprising determining an ECT prediction signal for predicting an ECT effect on the first laser diode by switching the second laser diode; and generating, for driving the first laser diode with a desired current profile, a driving signal based on the desired current profile and on the ECT prediction signal.

7. A method for compensating for an electric cross-talk, ECT, effect in a laser diode array, wherein the laser diode array comprises a plurality of laser diodes including a first laser diode and a second laser diode;

comprising:
determining an ECT prediction signal for predicting an ECT effect on the first laser diode by switching the second laser diode; and generating, for driving the first laser diode with a desired current profile, a driving signal based on the desired current profile and on the ECT prediction signal.

8. The method according to claim 7, wherein determining the ECT prediction signal is based on an ECT coupling coefficient associated with the ECT effect on the first laser diode by switching the second laser diode.

9. The method according to claim 8, further comprising:
capturing, by an image sensor, a first image of a first laser spot of the first laser diode with the second laser diode being turned off;

capturing, by the image sensor, a second image of a second laser spot of the first laser diode while switching on the second laser diode;

determining, by image processing of the first image and the second image, a ratio of laser spot energy of the first laser spot and the second laser spot; and calculating the ECT coupling coefficient based on the determined ratio of laser spot energy.

10. A writing head for a digital press for transforming a digital image to a physical image on a photoconductor; the writing head comprising:
a plurality of laser diodes including a first laser diode and a second laser diode;

an image sensor to capture a first image of a first laser spot of the first laser diode with the second laser diode being turned off and capture a second image of a second laser spot of the first laser diode while switching on the second laser diode;

a writing head controller comprising a processor and a memory, the memory comprises executable instructions that when executed by the processor cause the writing head controller to determine, by image processing of the first image and the second image, a ratio of laser spot energy of the first laser spot and the second laser spot, and calculate, based on the determined ratio of laser spot energy, an electric cross-talk (ECT) coupling coefficient associated with an ECT effect on the first laser diode by switching the second laser diode.

11. The writing head according to claim 10, wherein the memory further comprises executable instructions that when executed by the processor further cause the writing head controller to determine an ECT prediction signal for predicting an ECT effect on the first laser diode by switching the second laser diode, and generate, for driving the first laser diode with a desired current profile, a driving signal based on the desired current profile and on the ECT prediction signal.

12. The writing head according to claim 10, the image sensor to implement a delay between capturing the first image and the second image.

13. The writing head according to claim 10, the image sensor to capture the second image in response to a trigger voltage or current threshold.

14. The writing head according to claim 10, further comprising a spectral filter on e image sensor.

15. The writing head according to claim 10, the writing head controller to apply a weighting function that models sensitivity or non-linear signal processing of the image sensor.

16. The writing head according to claim 10, wherein
the plurality of laser diodes includes an array of laser diodes; and
the writing head controller to calculate an ECT coupling coefficient for all combinations of any two laser diodes in the array of laser diodes.

17. A writing head for a digital press for transforming a digital image to a physical image on a photoconductor; the writing head comprising:
a plurality of laser diodes including a first laser diode and a second laser diode;

a writing head controller including a processor and a memory, the memory comprises executable instructions that when executed by the processor cause the writing head controller to determine an electric cross-talk (ECT) prediction signal for predicting an ECT effect on the first laser diode by switching the second laser diode, and generate, for driving the first laser diode with a desired current profile, a driving signal based on the desired current profile and on the ECT prediction signal.

18. The writing head according to claim 17, further comprising an image sensor for capturing a first image of a first laser spot of the first laser diode with the second laser diode being turned off and capturing a second image of a second laser spot of the first laser diode while switching on the second laser diode;

wherein the memory further comprises executable instructions that when executed by the processor further cause the writing head controller to determine, by image processing of the first image and the second image, a ratio of laser spot energy of the first laser spot and the second laser spot, and calculate, based on the determined ratio of laser spot energy, an ECT coupling coefficient associated with the ECT effect on the first laser diode by switching the second laser diode.

19. A writing head for a digital press for transforming a digital image to a physical image on a photoconductor; the writing head comprising:

a plurality of laser diodes including a first laser diode and a second laser diode;

a writing head controller comprising an electronic hardware circuit with interconnected logic gates, the electronic hardware circuit, when powered, causes the writing head controller to determine an electric crosstalk (ECT) prediction signal for predicting an ECT effect on the first laser diode by switching the second laser diode, and generate, for driving the first laser diode with a desired current profile, a driving signal based on the desired current profile and on the ECT prediction signal.

20. The writing head according to claim 19, further comprising an image sensor for capturing a first image of a first laser spot of the first laser diode with the second laser diode being turned off and capturing a second image of a second laser spot of the first laser diode while switching on the second laser diode;

wherein the writing head further comprises a writing head controller comprising an electronic hardware circuit with interconnected logic gates, the electronic hardware circuit, when powered, causes the writing head controller to determine, by image processing of the first image and the second image, a ratio of laser spot energy of the first laser spot and the second laser spot, and calculate, based on the determined ratio of laser spot energy, an ECT coupling coefficient associated with the ECT effect on the first laser diode by switching the second laser diode.

\* \* \* \* \*

UNITED STATES PATENT AND TRADEMARK OFFICE
CERTIFICATE OF CORRECTION

PATENT NO. : 10,118,405 B2
APPLICATION NO. : 15/545976
DATED : November 6, 2018
INVENTOR(S) : Oron Ambar et al.

Page 1 of 1

It is certified that error appears in the above-identified patent and that said Letters Patent is hereby corrected as shown below:

In the Claims

In Column 10, Line 39 approx., Claim 14, delete "e" and insert -- the --, therefor.

Signed and Sealed this
Ninth Day of April, 2019

Andrei Iancu
*Director of the United States Patent and Trademark Office*